United States Patent
Kim et al.

(10) Patent No.: US 7,896,671 B2
(45) Date of Patent: Mar. 1, 2011

(54) MOUNTING SOCKET FOR MEMORY CARD AND SIM CARD HAVING INTEGRATED SENSING SWITCH

(75) Inventors: Jung-Hoon Kim, Seoul (KR); Masato Narita, Kanagawa (JP)

(73) Assignees: Tyco Electronics Japan G.K., Kanagawa-ken (JP); Tyco Electronics AMP Korea Ltd., Kyungsangbuk-do (KR)

( * ) Notice: Subject to any disclaimer, the term of this patent is extended or adjusted under 35 U.S.C. 154(b) by 329 days.

(21) Appl. No.: 12/132,841

(22) Filed: Jun. 4, 2008

(65) Prior Publication Data

US 2008/0298006 A1    Dec. 4, 2008

(30) Foreign Application Priority Data

Jun. 4, 2007    (KR) .................... 10-2007-0054529

(51) Int. Cl.
*H01R 29/00*    (2006.01)
(52) U.S. Cl. ...................... 439/188; 439/630
(58) Field of Classification Search .......... 439/630, 439/631, 188, 489
See application file for complete search history.

(56) References Cited

U.S. PATENT DOCUMENTS

| 6,623,304 B2 | 9/2003 | Harasawa et al. |
| 7,137,836 B2 | 11/2006 | Lu et al. |
| 2001/0006855 A1* | 7/2001 | Koitsalu ................. 439/188 |

FOREIGN PATENT DOCUMENTS

| JP | 2001-283987 | 12/2001 |
| WO | 2005-093636 A1 | 10/2005 |
| WO | 2007-025758 A1 | 3/2007 |

* cited by examiner

*Primary Examiner*—Javaid Nasri
(74) *Attorney, Agent, or Firm*—Barley Snyder LLC

(57) ABSTRACT

A mounting socket includes an insulating socket body provided with a subscriber identification module card insertion recess and a memory card insertion recess. A metal housing coupled to an upper surface of the socket body defines the subscriber identification module card insertion recess. A lower metal plate coupled to a lower surface of the socket body defines the memory card insertion recess. An integrated sensing switch electrically connects the metal housing to the lower metal plate. The integrated sensing switch electrically connects or electrically disconnects the metal housing and the lower metal plate during insertion of a subscriber identification module card into the subscriber identification module card insertion recess.

6 Claims, 8 Drawing Sheets

MOUNTING SOCKET FOR MEMORY CARD AND SIM CARD HAVING INTEGRATED SENSING SWITCH

CROSS-REFERENCE TO RELATED APPLICATIONS

This application claims the benefit of the filing date under 35 U.S.C. §119(a)-(d) of Korea Patent Application No. 10-2007-0054529, filed Jun. 4, 2007.

FIELD OF THE INVENTION

The present invention relates to a mounting socket for a memory card and a subscriber identication module (SIM) card that includes an integrated sensing switch that electrically connects or electrically disconnects a metal housing and a lower metal plate of the mounting socket during insertion of the SIM card in the mounting socket.

BACKGROUND

Generally, a memory card is used as an external element, to expand a storage space in a variety of equipment, such as a mobile phone, personal digital assistant (PDA), digital camera, and the like. On the basis of a size and standard thereof, the memory card has been introduced into a variety of forms, such as a secure digital (SD) memory card, multimedia card (MMC), compact flash (CF), memory stick, and the like. In addition, a subscriber identification module (SIM) card serves to store, for example, personal financial payment information, and is utilized as a non-contact type electronic credit card, traffic card, pre-paid card, and the like.

Nowadays, the utilization of the SIM card is gradually increasing, for example, for various functions of mobile phones. In particular, functionality of mobile phones is increasingly diversified. Mobile phones can be used, for example, as payment methods when a credit card is received in a phone body, as well as a player of music and moving images. However, most conventional mobile phones have been mainly fabricated in such a way that a memory card is incorporated therein to achieve a video-on-demand (VOD) or moving picture experts group layer—3 Audio (MP3) player function. This fabrication has a problem of low utilization efficiency of the memory card because it is incorporated within the memory phone and prevents users from being able to expand memory capacity of the mobile phone.

An external memory card has been introduced to solve the above-described problem, and a multiplicity of technologies for mounting the memory card in a mobile phone, together with a SIM card, have been developed. As shown in FIGS. 7-8, a conventional mounting socket for a memory card and a SIM card S includes a socket body 100, an upper housing 200 to cover the socket body 100 so as to define a space with an upper surface of the socket body 100 for insertion of the SIM card S, a lower plate 300 coupled to the socket body 100 so as to define a space with a lower surface of the socket body 100 for insertion of a memory card, and a sensing switch unit 400 provided on the upper surface of the socket body 100 to sense insertion of the SIM card S.

The socket body 100 includes a SIM card insertion recess 102 defined in the upper surface thereof for insertion of the SIM card S, SIM card connecting terminals 101 exposed from a bottom surface of the insertion recess 102, a memory card insertion recess 104 defined in the lower surface thereof for insertion of the memory card, and memory card connecting terminals 103 exposed from a bottom surface of the insertion recess 104.

The sensing switch unit 400 includes a sensing terminal 401 formed at the upper surface of the socket body 100 in the insertion recess 102, and a switch 402 formed at a position corresponding to a distal end of the sensing terminal 401 so as to be exposed from the upper surface of the socket body 100.

As the SIM card S is inserted into the SIM card insertion recess 102, the distal end of the sensing terminal 401 is bent downward by the SIM card S to thereby be brought into contact with an upper surface of the switch 402. In this way, the sensing switch unit 400 can sense insertion of the SIM card S.

However, the above-described prior art has the following problems. Fabrication and installation of the sensing switch unit 400, provided in the mounting socket to sense insertion of the SIM card S, is difficult due to a complicated configuration thereof. Further, installation of the sensing switch unit 400 requires a separate assembly process, complicating the overall assembly of the mounting socket.

SUMMARY

Therefore, the present invention has been made in view of the above problems, and it is an object of the present invention to provide a mounting socket for a memory card and a SIM card, which includes an integrated sensing switch capable of easily sensing insertion of a SIM card with a simplified configuration thereof, and achieving convenience in fabrication and installation without requiring a separate assembly process thereof, resulting in simplified overall assembly of the mounting socket. It is another object of the present invention to provide a mounting socket for a memory card and a SIM card, which includes an integrated sensing switch capable of being simply fabricated via cutting and bending of a metal housing.

This and other objects are achieved by a mounting socket comprising an insulating socket body provided with a subscriber identification module card insertion recess and a memory card insertion recess. A metal housing coupled to an upper surface of the socket body defines the subscriber identification module card insertion recess. A lower metal plate coupled to a lower surface of the socket body defines the memory card insertion recess. An integrated sensing switch electrically connects the metal housing to the lower metal plate. The integrated sensing switch electrically connects or electrically disconnects the metal housing and the lower metal plate during insertion of a subscriber identification module card into the subscriber identification module card insertion recess.

DETAILED DESCRIPTION OF THE EMBODIMENT(S)

Figure 1:
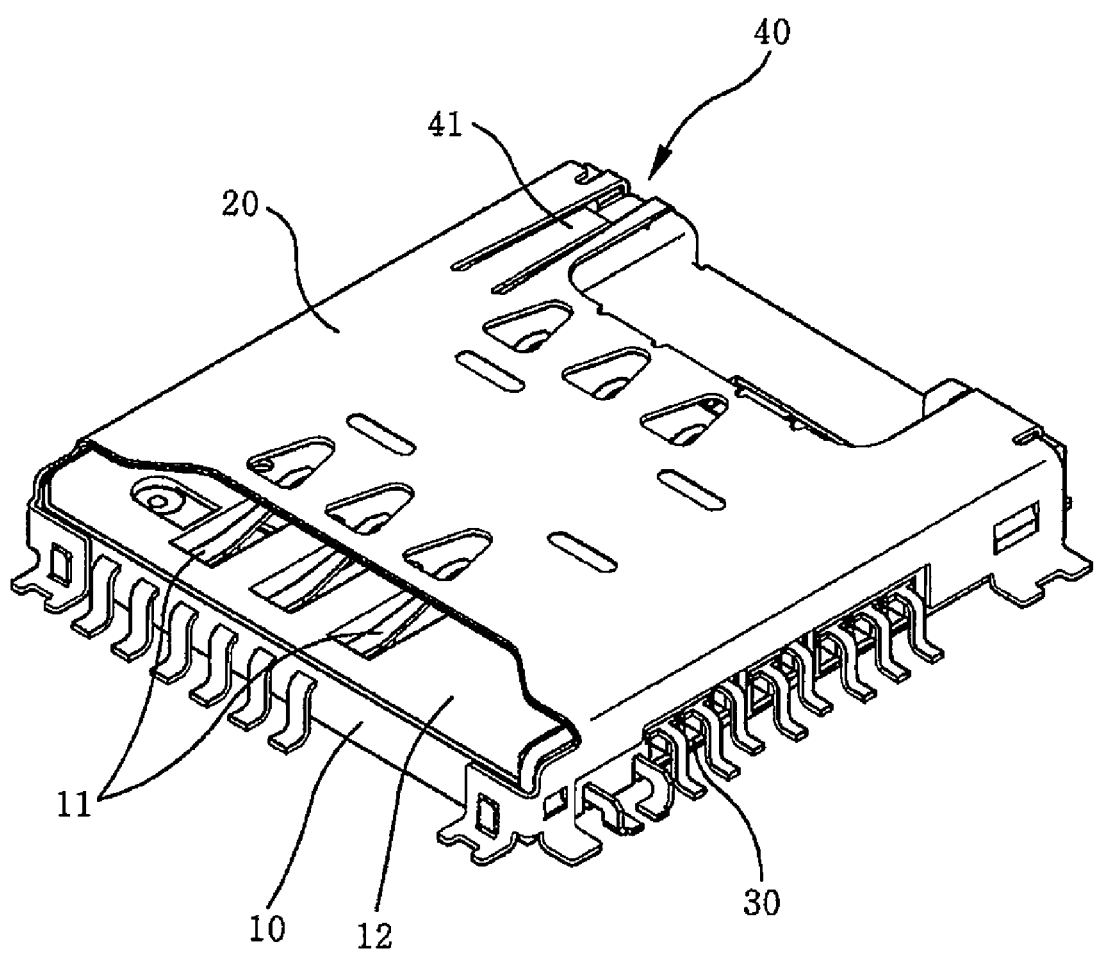
FIG. 1 is a perspective view of a mounting socket according to the present invention.

Now, a preferred embodiment of the present invention will be described in more detail with reference to the accompanying drawings. As shown in FIG. 1, a mounting socket for a memory card and a SIM card S (FIGS. 3-6) according to the present invention includes a socket body 10 made of a non-metallic insulating material, a metal housing 20 made of a thin conductive metal material and configured to be coupled to an upper surface of the socket body 10 so as to define a space for insertion of the SIM card S, a lower metal plate 30 made of a thin conductive metal material and configured to be coupled to a lower surface of the socket body 10, and an integrated sensing switch 40 integrally formed with the metal housing 20 and the lower metal plate 30 to sense insertion of the SIM card S.

Figure 2:
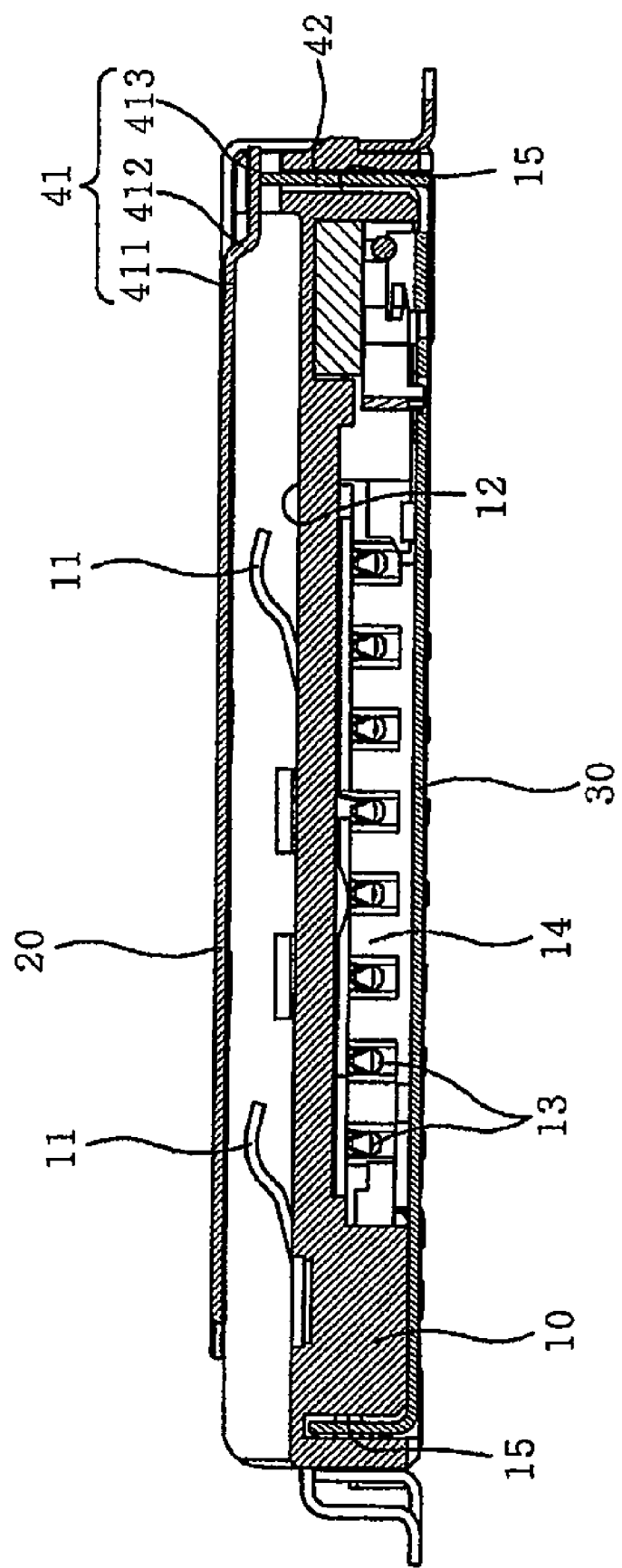
FIG. 2 is a side sectional view of the mounting socket according to the present invention.

As shown in FIG. 2, the socket body 10 includes a SIM card insertion recess 12 defined in the upper surface thereof for insertion of the SIM card S, SIM card connecting terminals 11 exposed from a bottom surface of the SIM card insertion recess 12, a memory card insertion recess 14 defined in the lower surface thereof for insertion of the memory card, memory card connecting terminals 13 exposed from a bottom surface of the memory card insertion recess 14, and insertion slots 15 formed in opposite ends of the lower surface thereof. The insertion slots 15 are used to couple the lower metal plate 30 to the lower surface of the socket body 10. The lower metal plate 30 is coupled to the lower surface of the socket body 10 via the insertion slots 15 to define a space for insertion of the memory card.

As shown in FIGS. 1-2, the integrated sensing switch 40 is integrally formed with the metal housing 20 and the lower metal plate 30. If the SIM card S is inserted into the socket body 10 in a state wherein the metal housing 20 and the lower metal plate 30 are electrically connected to each other, electric connection between the metal housing 20 and the lower metal plate 30 is interrupted by the SIM card S, and thus, the integrated sensing switch 40 can sense insertion of the SIM card S. The integrated sensing switch 40, which senses insertion of the SIM card S when electric connection between the metal housing 20 and the lower metal plate 30 is interrupted, includes an elastic bending piece 41 formed at a portion of one end of an upper surface of the metal housing 20 by cutting, the elastic bending piece 41 being configured to be bent downward and being able to be bent upward in an elastically restorable manner according to insertion of the SIM card S, and a substantially vertical contact protrusion 42 formed by bending a portion of one end of the lower metal plate 30 to vertically protrude beyond one of the insertion slots 15, the substantially vertical contact protrusion 42 being separated from the elastic bending piece 41 according to upward movement of the elastic bending piece 41.

More specifically, the elastic bending piece 41 formed at the metal housing 20 originally comes into contact with the substantially vertical contact protrusion 42 formed at the lower metal plate 30 to maintain electric connection therebetween. Then, as the SIM card S is inserted, the elastic bending piece 41 is bent upward in an elastically restorable manner by the inserted SIM card S, thereby being separated from the substantially vertical contact protrusion 42 so as to be electrically released from the substantially vertical contact protrusion 42. In this way, the integrated sensing switch 40 can sense insertion of the SIM card S.

The elastic bending piece 41 consists of an incised portion 411 formed by incising the portion of one end of the upper surface of the metal housing 20, an inclined bending portion 412 extending obliquely downward from a distal end of the incised portion 411, and a contact portion 413 extending horizontally from a distal end of the inclined bending portion 412, a lower surface of the contact portion 413 normally coming into contact with an upper end of the substantially vertical contact protrusion 42. The incised portion 411 serves to elastically support the inclined bending portion 412 and the contact portion 413 in an elastically restorable manner. The inclined bending portion 412 serves to move the contact portion 413 upward when coming into contact with and being pushed by an end of the inserted SIM card. The contact portion 413 is separated from the substantially vertical contact protrusion 42 as it is moved upward by the inclined bending portion 412, thereby sensing insertion of the SIM card. As shown, the contact portion 413 of the elastic bending piece 41, formed by incising the portion of one end of the metal housing 20, comes into close contact with the upper end of the substantially vertical contact protrusion 42 integrally formed at the end of the lower metal plate 30 to protrude beyond the insertion slot 15, maintaining electric connection between the metal housing 20 and the lower metal plate 30.

Figure 3:
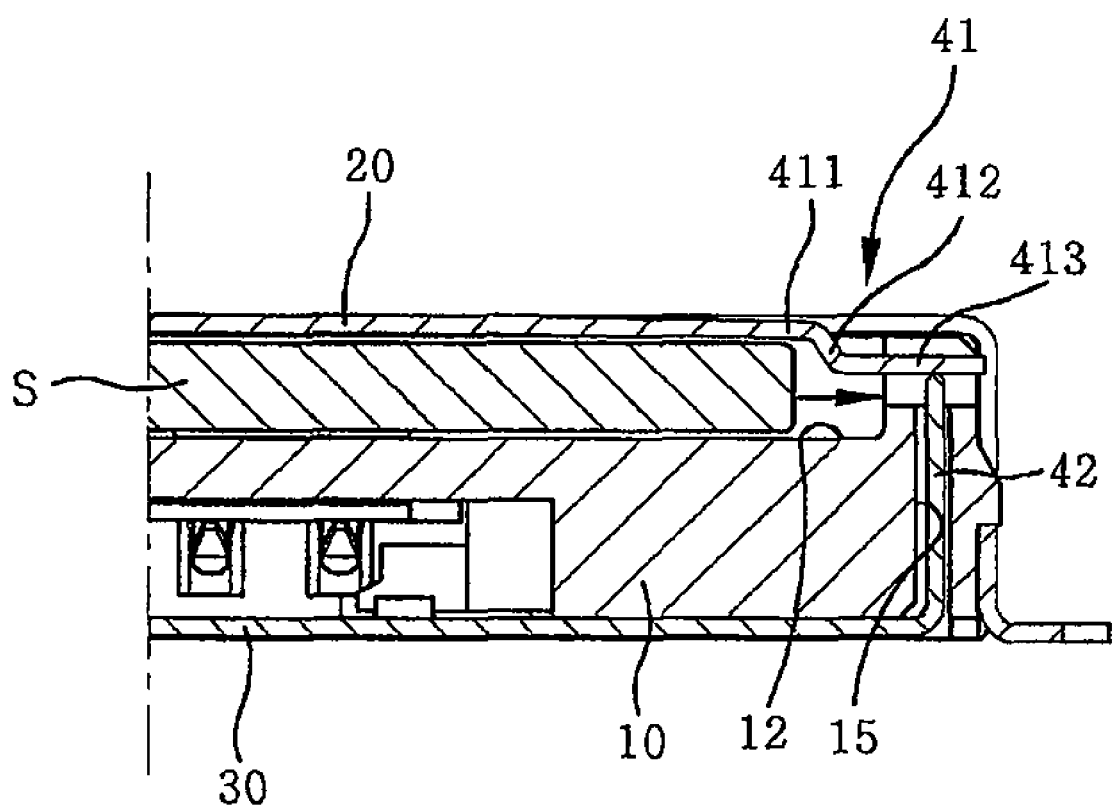
FIG. 3 is a schematic enlarged side sectional view of the mounting socket according to the present invention showing a state just before a SIM card is completely inserted.
Figure 4:
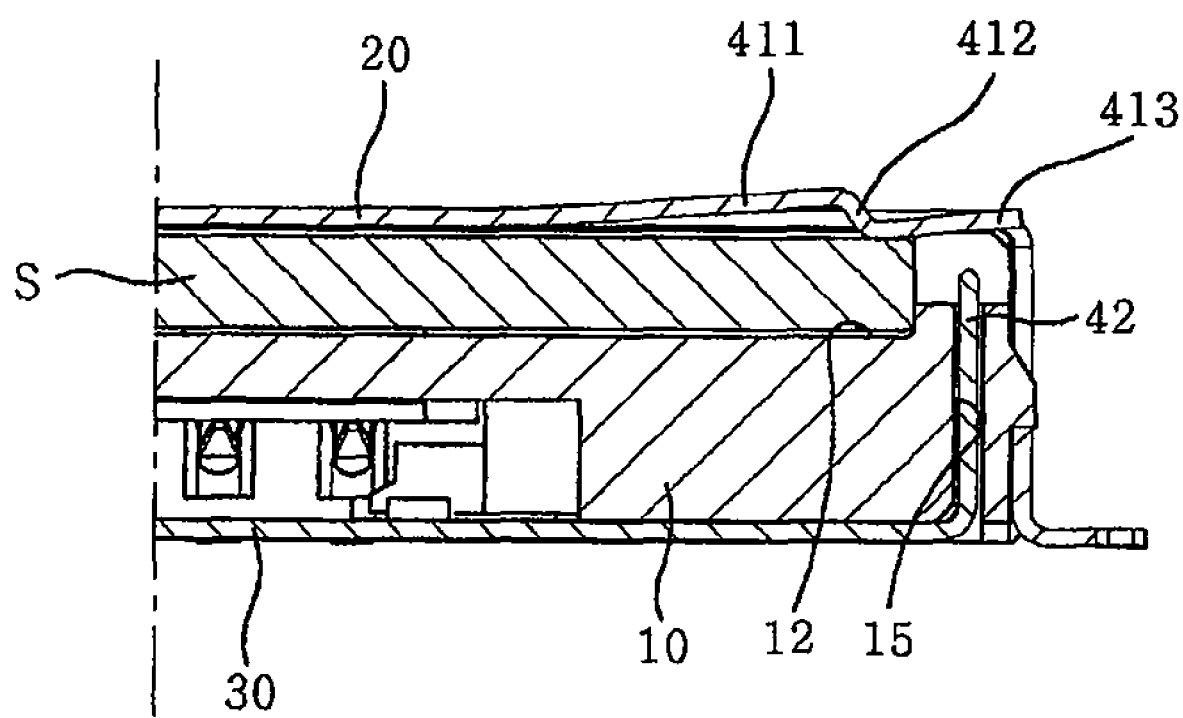
FIG. 4 is a schematic enlarged side sectional view of a mounting socket according to the present invention showing a state just after a SIM card is completely inserted.

As shown in FIGS. 3-4, if the SIM card S is inserted into the SIM card insertion recess 12 of the socket body 10 in the above-described electrically connected state, the inclined bending portion 412 of the elastic bending piece 41 is brought into contact with and pushed by the SIM card S, thereby moving the contact portion 413 upward. As a result, the contact portion 413 is separated from the substantially vertical contact protrusion 42 integrally formed at the end of the lower metal plate 30, interrupting the electric conduction between the metal housing 20 and the lower metal plate 30. With the interruption of electric conduction, the integrated sensing switch 40 can sense insertion of the SIM card S.

Figure 5:
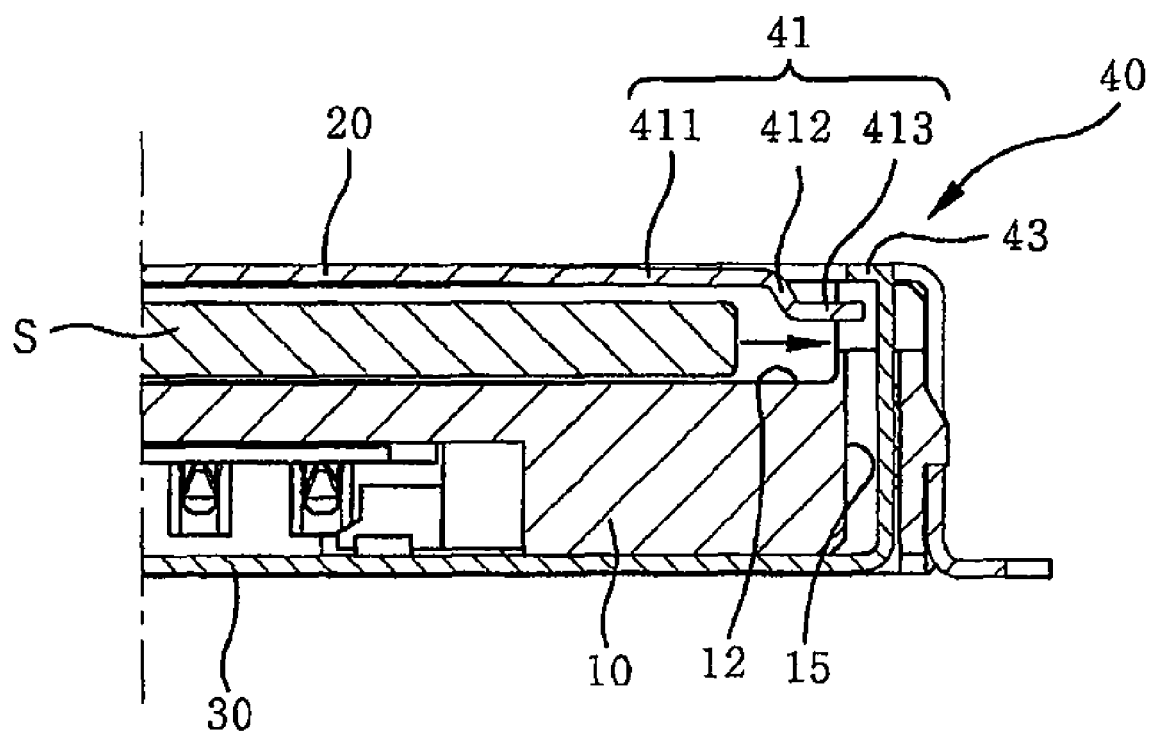
FIG. 5 is a schematic enlarged side sectional view of a mounting socket according to an alternate embodiment of the invention showing a state just before a SIM card is completely inserted.
Figure 6:
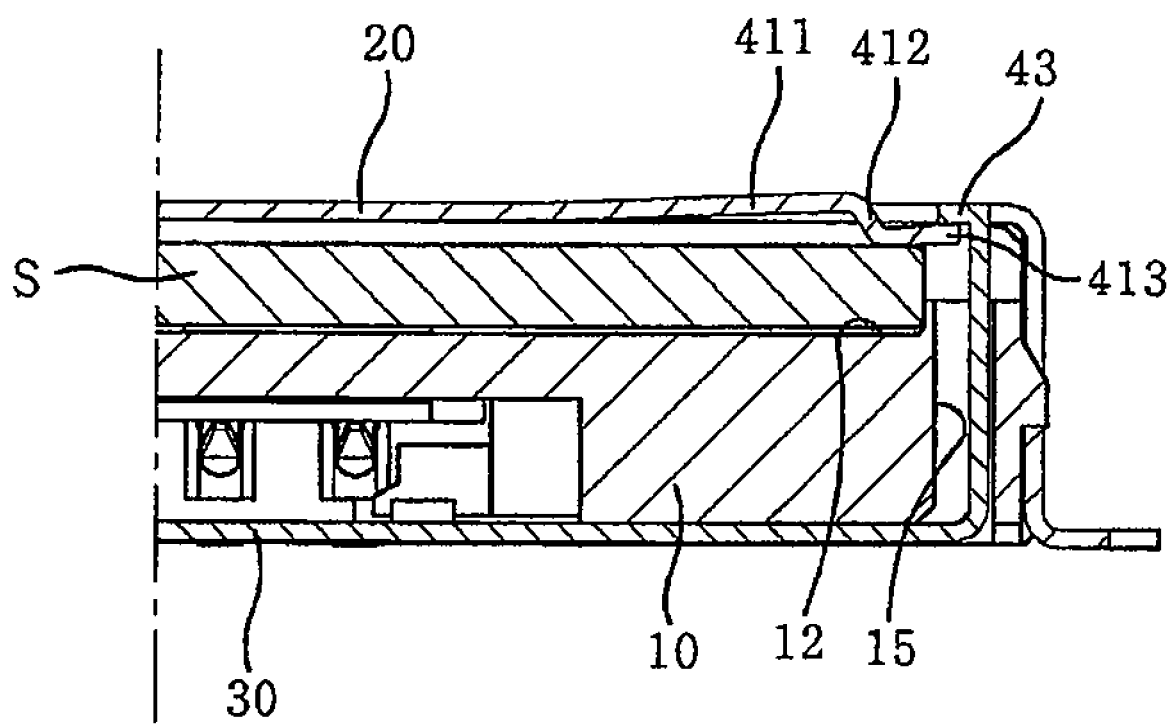
FIG. 6 is a schematic enlarged side sectional view of the mounting socket according to an alternate embodiment of the invention showing a state just after the SIM card is completely inserted.
Figure 7:
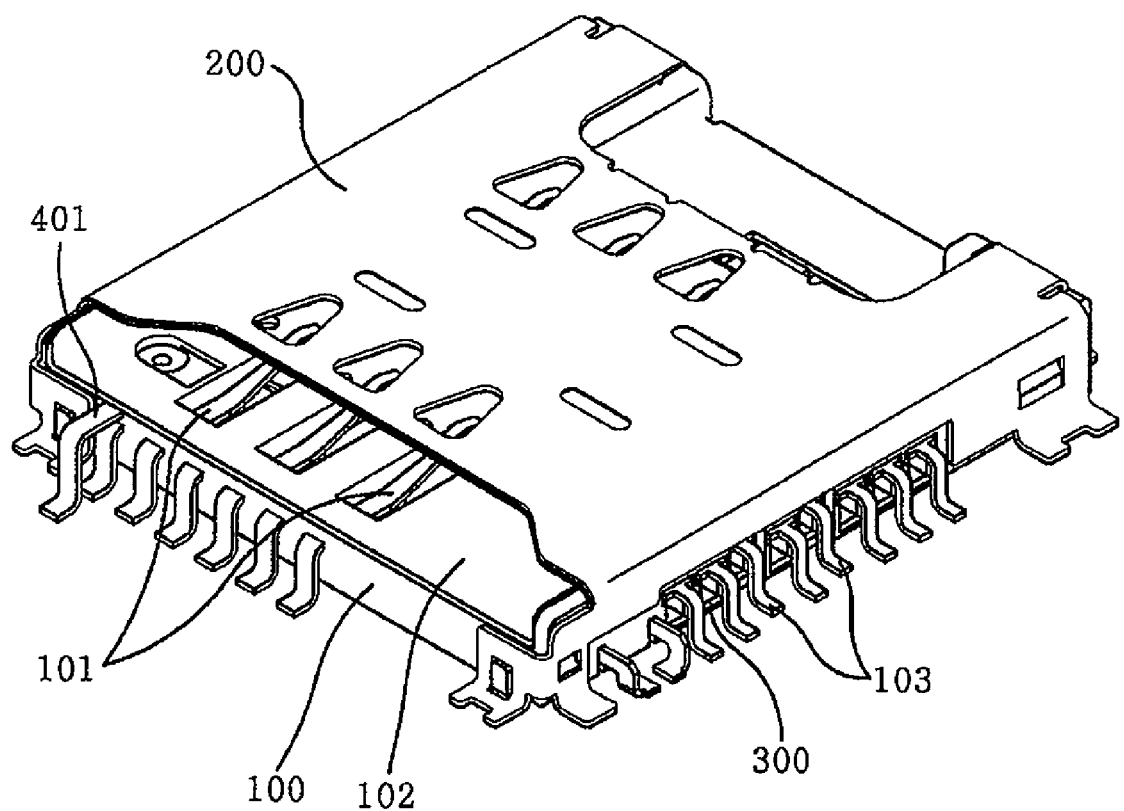
FIG. 7 is a perspective view of a mounting socket according to the prior art.
Figure 8:
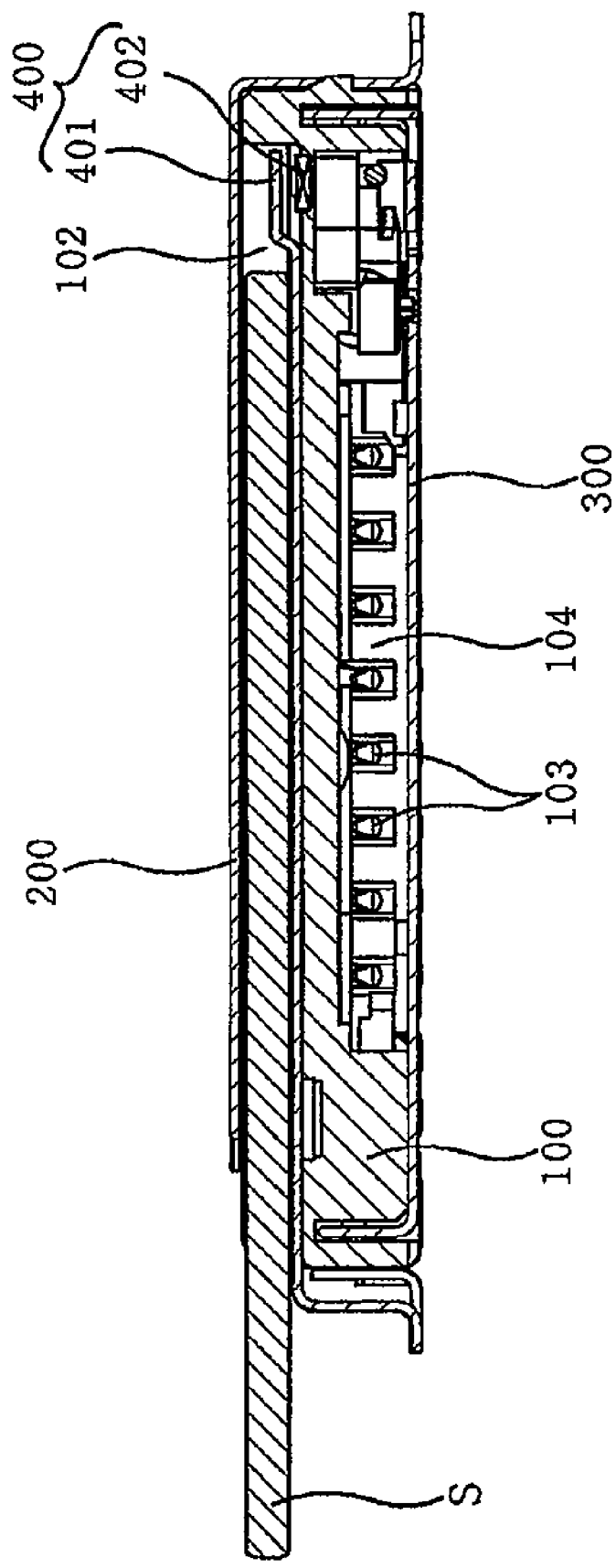
FIG. 8 is a schematic side sectional view of the mounting socket according to the prior art.

FIGS. 5-6 show a mounting socket according to an alternate embodiment of the invention. As shown in FIGS. 5-6, the integrated sensing switch 40 of the mounting socket according to another embodiment of the present invention is integrally formed with the metal housing 20 and the lower metal plate 30. If the SIM card S is inserted into the socket body 10 in a state wherein the metal housing 20 and the lower metal plate 30 are electrically disconnected from each other, the metal housing 20 and the lower metal plate 30 are electrically connected to each other by the SIM card S, and thus, the integrated sensing switch 40 can sense insertion of the SIM card into the SIM card insertion recess 12 of the mounting socket.

The integrated sensing switch 40 includes the elastic bending piece 41 formed at the portion of one end of the upper surface of the metal housing 20 by cutting, the elastic bending piece 41 being configured to be bent downward and being able to be bent upward in an elastically restorable manner according to insertion of the SIM card, and a bent contact protrusion 43 formed by bending the portion of one end of the lower metal plate 30 to vertically protrude beyond one of the insertion slots 15, the bent contact protrusion 43 having an inwardly bent upper end to come into contact with the distal end of the elastic bending piece 41 according to upward movement of the elastic bending piece 41.

The elastic bending piece 41 consists of the incised portion 411 formed by incising the portion of one end of the upper surface of the metal housing 20, the inclined bending portion 412 extending obliquely downward from the distal end of the incised portion 411, and the contact portion 413 extending horizontally from the distal end of the inclined bending portion 412, an upper surface of the contact portion 413 normally coming into contact with the upper end of the bent contact protrusion 43. The contact portion 413 of the elastic bending piece 41, formed by incising the portion of one end of the metal housing 20, is separated from the upper end of the bent contact protrusion 43 integrally formed at the end of the lower metal plate 30 so as to protrude beyond the insertion slot 15, thereby maintaining electric disconnection between the metal housing 20 and the lower metal plate 30.

As shown in FIGS. 5-6, if the SIM card S is inserted into the SIM card insertion recess 12 of the socket body 10 in the above-described electrically disconnected state, the inclined bending portion 412 of the elastic bending piece 41 is brought into contact with and pushed by the SIM card S, thereby moving the contact portion 413 upward. As a result, the contact portion 413 is brought into contact with the bent contact protrusion 43 integrally formed at the end of the lower metal plate 30, thereby achieving electric connection between the metal housing 20 and the lower metal plate 30. With the electric connection, the integrated sensing switch 40 can sense insertion of the SIM card S.

As apparent from the above description, the present invention provides a mounting socket for the memory card and the SIM card S having the integrated sensing switch 40. The integrated sensing switch 40 of the present invention has the effects of easily sensing insertion of a SIM card S with a simplified configuration thereof, and achieving convenience in fabrication and installation without requiring a separate assembly process thereof, resulting in simplified overall assembly of the mounting socket. Further, according to the present invention, the integrated sensing switch 40 can be simply fabricated via cutting and bending of a metal housing 20. This has the effect of significantly simplifying fabrication and installation of the integrated sensing switch 40.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A mounting socket, comprising:
    an insulating socket body provided with a subscriber identification module card insertion recess and a memory card insertion recess;
    a metal housing coupled to an upper surface of the socket body that defines the subscriber identification module card insertion recess;
    a lower metal plate coupled to a lower surface of the socket body that defines the memory card insertion recess; and
    an integrated sensing switch electrically connecting the metal housing to the lower metal plate, the integrated sensing switch electrically connecting or electrically disconnecting the metal housing and the lower metal plate during insertion of a subscriber identification module card into the subscriber identification module card insertion recess.

2. The mounting socket of claim 1, wherein the integrated sensing switch is integrally formed with the metal housing and the lower metal plate.

3. The mounting socket of claim 1, wherein the socket body includes insertion slots and the lower metal plate include substantially vertical contact protrusions that are received in the insertion slots to attach the lower metal plate to the socket body.

4. The mounting socket of claim 3, wherein at least one of the substantially vertical contact protrusions extend beyond the insertion slots and contact the metal housing to form the integrated sensing switch.

5. The mounting socket of claim 4, wherein the metal housing includes an elastic bending portion that contacts the substantially vertical contact protrusion.

6. The mounting socket of claim 5, wherein the elastic bending portion is bent downward such that the elastic bending portion is be bent upward in an elastically restorable manner by the subscriber identification module card.

* * * * *